United States Patent [19]
Allen

[11] Patent Number: 6,116,148
[45] Date of Patent: Sep. 12, 2000

[54] MULTIPLE TIER VERTICAL FLOW TOASTER

[75] Inventor: Dillis V. Allen, Elgin, Ill.

[73] Assignee: Vardon Golf Company, Inc., Elk Grove Village, Ill.

[21] Appl. No.: 09/320,018

[22] Filed: May 26, 1999

[51] Int. Cl.[7] .................................................. A47J 37/08
[52] U.S. Cl. ........................ 99/329 RT; 99/386; 99/385
[58] Field of Search ............................ 99/325, 386, 385, 99/387, 393, 329 RT

[56] References Cited

U.S. PATENT DOCUMENTS

| | | | |
|---|---|---|---|
| 2,036,826 | 4/1936 | Peters | 99/386 |
| 2,160,351 | 5/1939 | Bemis | 99/387 |
| 5,673,610 | 10/1997 | Stuck | 99/386 |

*Primary Examiner*—Gabrielle Brouillette
*Assistant Examiner*—Robert Madsen
*Attorney, Agent, or Firm*—Dillis V. Allen, Esq.

[57] ABSTRACT

A space-saving multiple tier vertical flow toaster for simultaneously toasting items loaded vertically from the top of the toaster. The first items loaded into the toaster pass through an upper tier and are arrested in a lower tier. The next items loaded are arrested in the upper tier and both the upper tier and lower tier items are toasted sequentially. A control system discharges the lower tier items first and then discharges the upper tier items enabling them to pass through the lower tier and be discharged.

5 Claims, 2 Drawing Sheets

MULTIPLE TIER VERTICAL FLOW TOASTER

BACKGROUND OF THE INVENTION

A preliminary patentability search based upon this present invention produced the following prior United States patents:

| Inventor | Pat. No. | Issue Date |
|---|---|---|
| Di Rosa, et al. | 2,548,958 | 4-17-51 |
| Bertino | 2,552,135 | 5-8-51 |
| Frederico | 2,588,100 | 3-4-52 |
| Foster | 2,644,392 | 7-7-53 |
| Ihrke | 2,687,078 | 8-24-54 |
| Matzenauer | 2,918,860 | 12-29-59 |
| Woron | 3,140,650 | 7-14-64 |
| Maindonald | 3,336,858 | 8-22-67 |
| Capucio | 3,824,915 | 7-23-74 |
| Weiss | 4,404,899 | 9-20-83 |
| Maroti, et al. | 4,577,550 | 3-25-86 |
| DeMars | 5,522,306 | 6-4-96 |

The Di Rosa, et al., U.S. Pat. No. 2,548,958; the Bertino, U.S. Pat. No. 2,552,135; Frederico, U.S. Pat. No. 2,588,100; the Foster, U.S. Pat. No. 2,644,392; the Matzenauer, U.S. Pat. No. 2,918,860; the Maindonald, U.S. Pat. No. 3,336,858; the Capucio, U.S. Pat. No. 3,824,915; the Maroti, et al., U.S. Pat. No. 4,577,550, and the DeMars, U.S. Pat. No. 5,522,306, all show vertical flow toasters with single tier toasting; i.e., the vertical level or vertical position of the items to be toasted when toasting is proceeding, is in a single plane.

The Ihrke, U.S. Pat. No. 2,687,078; the Woron, U.S. Pat. No. 3,140,650, and the Weiss, U.S. Pat. No. 4,404,899, show toasting systems in which the control system coordinates discharge with the completion of the toasting cycle and are relevant for their disclosures of similar control systems.

It is a primary object of the present invention to ameliorate the problems noted above in vertical flow toasters and provide a more compact toasting system.

SUMMARY OF THE PRESENT INVENTION

In accordance with the present invention, a space-saving multiple tier vertical flow toaster is provided for sequentially toasting items loaded vertically from the top of the toaster. Each tier has rotary item supports moveable from an item support or holding position blocking downward movement of an item to an item release position permitting an item to pass downwardly. A control system causes the first loaded items to pass through the upper tier and be blocked by the lower tier and initiates lower tier toasting at the same time. The control system thereafter causes the next loaded items to be blocked by the upper tier and initiates upper tier toasting. When the lower tier toasting cycle ends, the control system moves the lower supports to their release position discharging the lower items downwardly and thereafter when the upper tier cycle is complete, the control system moves the upper supports to their release position permitting the upper tier items to pass downwardly through the lower tier and be discharged.

Another feature of the present invention is the provision of a plurality of removable legs for supporting the toaster above the counter and a collapsible discharge ramp system that enables the user to assemble these elements and reduce the overall size of the toaster during shipping and handling.

Other objects and advantages of the present invention will appear more clearly from the following detailed description.

DETAILED DESCRIPTION OF THE PREFERRED EMBODIMENT

Figure 1:
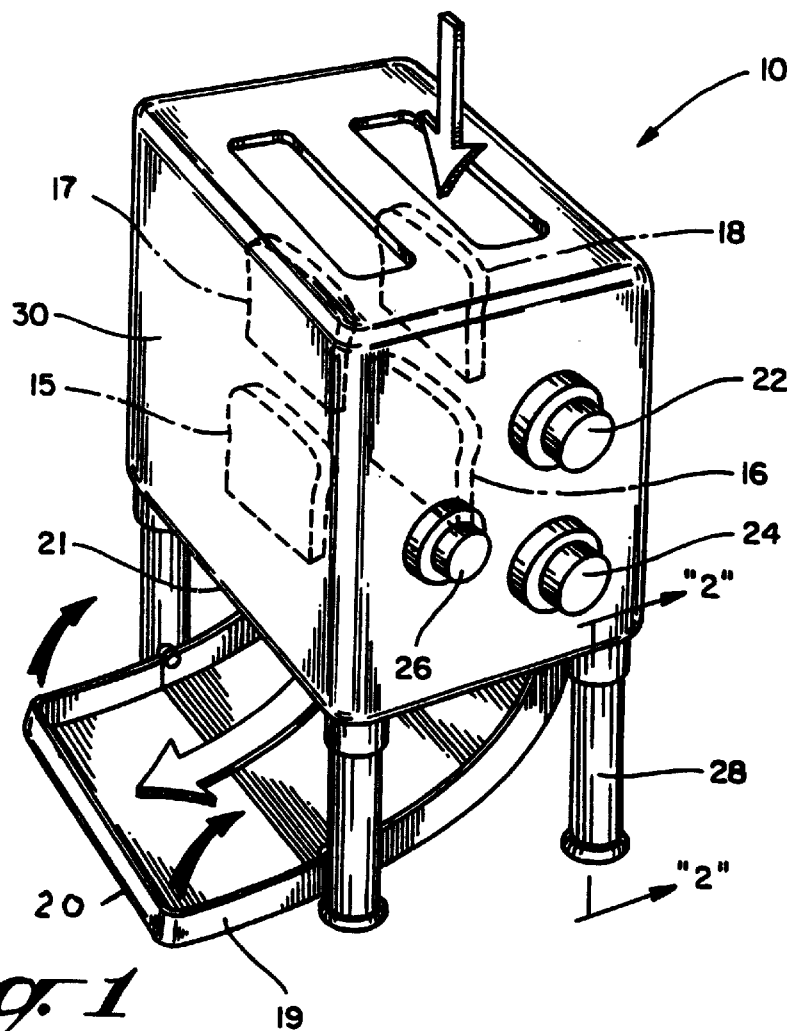
FIG. 1 is a perspective view of the present multiple tier vertical flow toaster.
Figure 2:
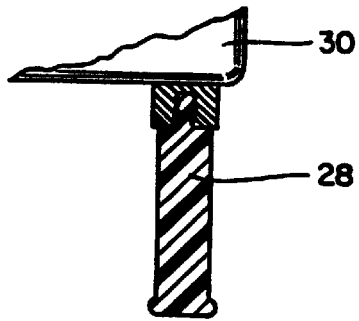
FIG. 2 is a fragmentary sub-assembly of one of the legs or feet for supporting the toaster above the counter.

One of the important advantages of the present multiple tier vertical flow toaster is that it is, in essence, self-cleaning because toast particles that normally break off during the toasting operation simply fall down into the tray where they can be easily cleaned by the user without disassembling the toaster and cleaning inside, which the average housewife is really not mechanically equipped to do and, of course, because this is an electrical appliance, it is not a good idea for the consumer to be sticking his or her fingers inside electrical circuitry. Thus, the self-cleaning and safety features of the present device should make it attractive to OEM manufacturers.

It should also be understood that the present multiple tier toaster has commercial application(as well as consumer), particularly in small restaurants. It is contemplated that there could be provided more than the two tiers disclosed in the drawings to accommodate greater toasting capacity; for example, three tiers or four tiers could be provided using exactly the same technology discussed hereinafter; i.e., the tiers operate sequentially from bottom to top during the multiple tier toasting operation. And the conveyance passages can be easily sized for bagels, now popularly sold in small kiosks with counter consuming large horizontal traveling conveyor toasters that will be economically replaced with the present vertical system.

Figure 3:
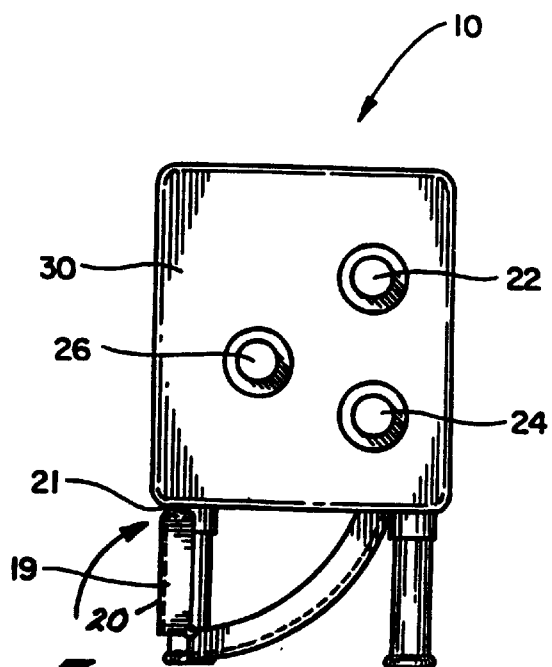
FIG. 3 is a side view of the toaster showing a portion of the ramp in its collapsed position.

The four pieces of toast illustrated in FIG. 1, for example, are inserted into the toaster vertically from the top, all cook substantially at the same time, but sequentially, with the lower two pieces completing the cooking cycle before the top two pieces. The lower tier system 11 shown in FIG. 4 releases the lower pieces 15 and 16 before the upper tier system 12 releases the upper pieces 17 and 18 into a tray assembly 19. Tray assembly 19 has a forward section 20 that pulls upwardly to fit flush under the front edge 21 of the toaster as shown in FIG. 3.

The toaster is controlled by an upper knob 22, a lower knob 24, and also a cycle time control knob 26.

An important aspect of the present invention is that the toaster 10 has the same horizontal dimensions as a standard small two piece toaster(in the consumer version) so that while it has the capability of toasting four pieces at one time, it occupies no more counter space than a small two piece toaster. It is the vertical extent of the toaster that is lengthened, according to the present invention.

The toaster is held above the counter by four detachable posts or feet 28 that are assembled to the base of the frame 30 by the user. In this way the total size of the shipping container is markedly reduced. The tray 19 is also detachable and assembled to the toaster by the user and held in place by grooves(not shown) in the inside surfaces of the post 28.

Figure 4:
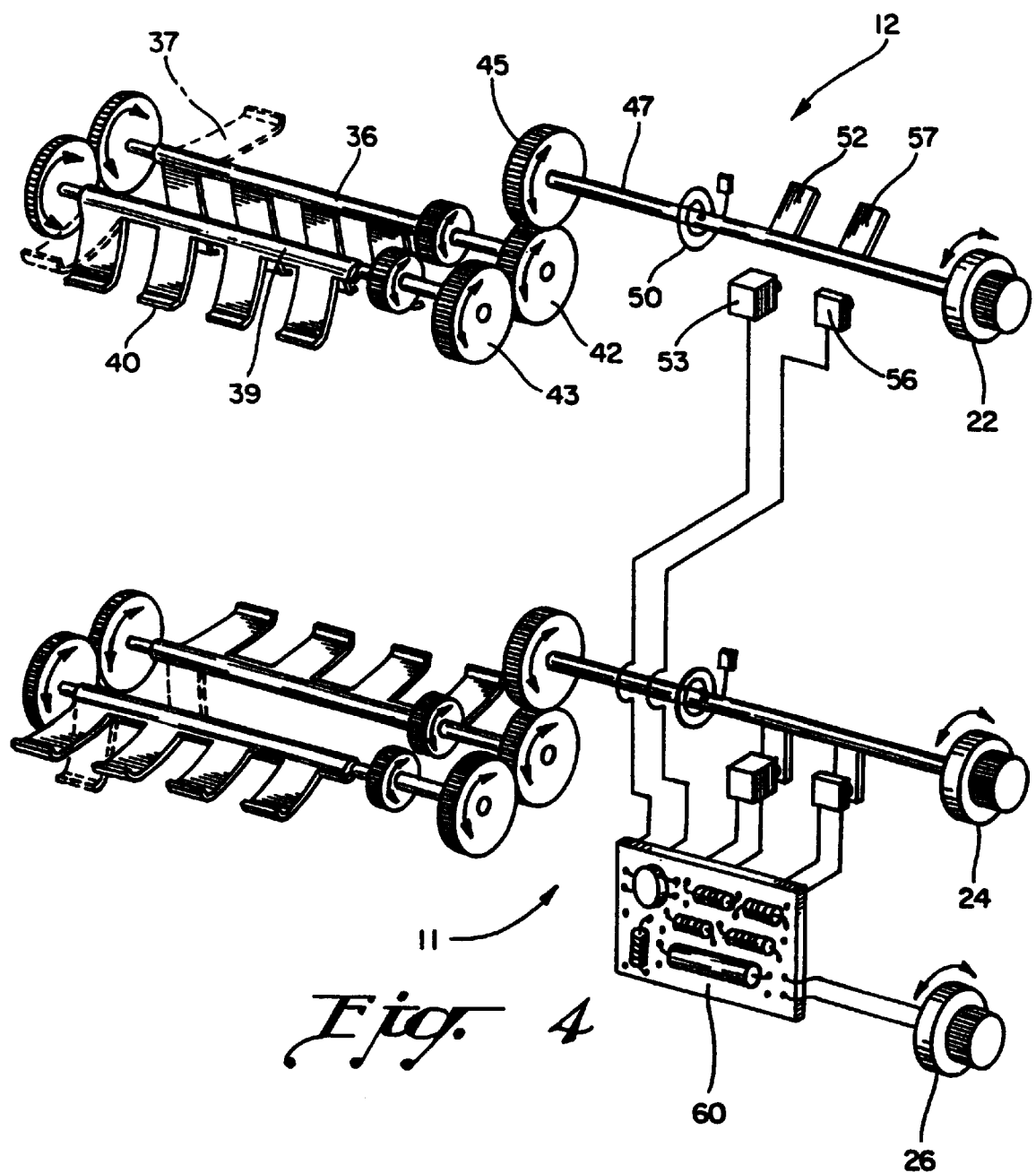
FIG. 4 is an exploded view of the operating and control mechanisms for the toaster illustrated in FIGS. 1 to 3.

As seen in FIG. 4, the upper tier system 12 and the lower tier system 10 are substantially the same so that reference will be made with respect to the details of the upper tier system 12 with the understanding that the lower tier system 11 is substantially the same. Upper tier system 12 is seen to include a rotatable shaft 36 with a plurality of integral fingers 37, mounted in both frame ends of the toaster housing for only rotary motion. A mirror image shaft 39 and its fingers 40 are mounted in the same horizontal plane as shaft 36. Shafts 36 and 39 rotate from a holding position shown in dotted line in FIG. 4(top), 90 degrees downwardly to a release position shown in full lines in FIG. 4, where they release the toasted items. Shaft 36 is driven by gear 42, while shaft 39 is driven by gear 43, which engages gear 42 for opposite rotation. Both gears are driven by drive gear 45 engaging gear 42 carried on the end of a cock shaft 47 rotated by knob 22. A torsion spring 50 biases the shaft 47 toward its release position and is cocked by the user by rotating knob 22 in a clockwise direction. Shaft 47 carries a finger 52 that actuates a start switch 53 as the user rotates knob 22 to its cocked position.

The shaft is held in the cocked position by an electromagnet 56 holding a permanent magnet 57 carried by the shaft 47. A timing circuit board 60 deactivates electromagnet 56 and releases the shaft 47 when the toast cycle is completed causing torsion spring 50 to rotate shaft 47 counter-clockwise to a stop(not shown); thereby rotating shaft 36 in the clockwise direction and shaft 39 in a counter-clockwise direction causing the fingers 37 and 40 to move to the release position illustrated in FIG. 4, releasing the toasted item.

The lower tier system 11 operates in the same way;

that is, upon clockwise rotation of knob 24, the support fingers in the lower section move from the dotted line position to the blocking position shown in full line in FIG. 4, and upon completion of the toasting cycle, the circuit board 60 deactivates the electromagnet associated with lower tier system 11, causing the supports to move their fingers to the dotted line release position shown in FIG. 4, releasing the toasted items and causing their discharge.

The details of the timing circuit board 60 are known in the art and form no part of the present invention except to the extent that the lower section 11 and the upper section 12 operate independently except for cycle time or length which is the same for both so the cycles terminate sequentially beginning from the bottom up, which is an important aspect of the present invention.

While the heating elements are not shown in the drawings, it should be understood that there are only three heating elements required, which further reduces the cost of this toaster. That is, two of the heating elements are positioned on the outside of the sections 11 and 12 and just outside of the fingers 37, 40, and the third heating element extends between the shafts 36 and 39. This is an important cost-reduction feature of the present invention.

The user initiates the function of the present toaster 10 as follows: If the user desires only two pieces of toast, the upper assembly stays in its down or release position, and the user cocks the lower assembly 11 by rotating knob 24 clockwise and drops the items to be toasted in the top. These items pass through the upper section 12 but are blocked by the lower section 11. The cycle then ensues and the two pieces, after completing the cycle, are released from the tray by the circuit board 60.

If four pieces are desired to be toasted, the user cocks the lower section 11, drops the first two pieces in, initiating the heating cycle, and then cocks the upper section 12 and drops the third and fourth pieces in, which of course, will then be blocked by the upper section 12. Because the cycle times are equal because they are determined by the position of the cycle time control 26, which is common to both lower section 11 and upper section 12, the lower section will release the two lower pieces first, and enable clearance for the upper pieces to pass through the fingers in the lower section 11, as that cycle is completed and the two upper pieces are released.

What is claimed is:

1. A multiple tier vertical flow toaster, comprising: a frame, a lower section for toasting a first item in the frame having a releasable support movable from an item holding position to an item release position permitting the item to be toasted to be released generally vertically downwardly, an upper section for toasting a second item and not the first item in the frame having a releasable support movable from an item holding position to an item release position permitting the item to be toasted to be released generally downwardly, heating means for generally simultaneously toasting the items in the upper and lower sections, and control means for the upper and lower section supports and the heating means permitting the lower section item to be loaded first and the upper section item to be loaded second, said control means after the items have been toasted controlling the upper and lower section supports to release the item in the lower section first and thereafter to release the item in the upper section with the lower section releasable support in the item release position so the item toasted in the upper section passes through the lower section without being further toasted.

2. A multiple tier vertical flow toaster as defined in claim 1, said control means constructed to first release the item in the lower section and to thereafter release the item in the upper section, said lower section including two adjacent supports for holding and releasing two items, said upper section including two adjacent supports for holding and releasing two items, said frame including top loading slots permitting the items to enter the upper section and the lower section.

3. A multiple tier vertical flow toaster as defined in claim 1, including a top loading slot in the frame permitting entry of the items into the upper section and the lower section, said upper section and lower section having a common flow path so that a first item entering the top loading slot passes through the upper section when the upper section support is in the release position and into the lower section in the holding position.

4. A multiple tier vertical flow toaster as defined in claim 1, wherein the control means senses when the item in the lower section is toasted and controls the support in the lower section to move to the release position, said control means thereafter senses when the item in the upper section is toasted and causes the support in the upper section to move to the release position.

5. A vertical flow toaster, comprising: a frame, two top loading slots in the frame for items to be toasted, supports in the frame for the items to be toasted movable from an item support position to an item release position permitting the toasted item to pass generally vertically downwardly in the frame, a plurality of removable feet attached to the frame for supporting the frame above a counter, and a removable arcuate ramp attachable to the frame for guiding items exiting the frame, said ramp being mounted between the removable feet.

* * * * *